United States Patent
Ginsberg et al.

(10) Patent No.: US 9,053,823 B2
(45) Date of Patent: *Jun. 9, 2015

(54) METHOD AND APPARATUS FOR AN ALTERNATIVE SUPPRESSION POOL COOLING FOR BOILING WATER REACTORS

(75) Inventors: Robert Joseph Ginsberg, Wilmington, NC (US); John R. Bass, Wilmington, NC (US); Richard M. Rogers, Wilmington, NC (US); Mark W. Siewert, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 588 days.

This patent is subject to a terminal disclaimer.

(21) Appl. No.: 13/330,005

(22) Filed: Dec. 19, 2011

(65) Prior Publication Data

US 2013/0156145 A1 Jun. 20, 2013

(51) Int. Cl.
| | |
|---|---|
| G21C 9/00 | (2006.01) |
| G21C 9/012 | (2006.01) |
| G21C 15/18 | (2006.01) |
| G21D 1/02 | (2006.01) |
| G21D 3/04 | (2006.01) |
| G21C 9/004 | (2006.01) |

(52) U.S. Cl.
CPC ............... *G21C 9/012* (2013.01); *G21C 9/004* (2013.01); *G21C 15/182* (2013.01); *G21D 1/02* (2013.01); *G21D 3/04* (2013.01); *Y02E 30/31* (2013.01)

(58) Field of Classification Search
CPC ...... G21C 9/004; G21C 9/012; G21C 15/182; G21D 3/04; G21D 1/02

USPC .......................................................... 376/299
See application file for complete search history.

(56) References Cited

U.S. PATENT DOCUMENTS

| | | | |
|---|---|---|---|
| 3,984,282 A * | 10/1976 | Kleimola | ...................... 376/282 |
| H000627 H | 4/1989 | Peng | |
| 4,950,448 A | 8/1990 | Gou et al. | |
| 4,998,509 A | 3/1991 | Gou et al. | |

(Continued)

FOREIGN PATENT DOCUMENTS

| | | |
|---|---|---|
| JP | 2-47589 A | 2/1990 |
| JP | 02-251794 A | 10/1990 |

(Continued)

OTHER PUBLICATIONS

Search Report issued in connection with EP Applicaiton No. 12196014.0, Feb. 27, 2013.

(Continued)

*Primary Examiner* — Frank J McGue
(74) *Attorney, Agent, or Firm* — Harness, Dickey & Pierce, P.L.C.

(57) ABSTRACT

A method and apparatus for providing an alternative cooling system for the suppression pool of a Boiling Water Reactor (BWR) nuclear reactor. The cooling system is operated to cool the suppression pool in the event of a plant accident when normal plant electricity is not available for the conventional residual heat removal system and pumps. The cooling system may also be used to supplement the cooling of the suppression pool via the residual heat removal system. The cooling system is operated and controlled from a remote location, which is ideal during a plant emergency.

15 Claims, 3 Drawing Sheets

(56) References Cited

U.S. PATENT DOCUMENTS

| | | | |
|---|---|---|---|
| 5,021,212 A * | 6/1991 | Kataoka et al. | 376/283 |
| 5,087,408 A * | 2/1992 | Tominaga et al. | 376/283 |
| 5,213,755 A * | 5/1993 | Kelly et al. | 376/210 |
| 5,349,616 A | 9/1994 | Nakayama et al. | |
| 5,491,730 A | 2/1996 | Kataoka et al. | |
| 5,661,770 A * | 8/1997 | Spinks | 376/298 |
| 5,887,043 A * | 3/1999 | Spinks | 376/298 |
| 6,718,001 B2 * | 4/2004 | Hidaka et al. | 376/283 |
| 2012/0051484 A1 * | 3/2012 | Schmidt et al. | 376/273 |
| 2012/0250813 A1 * | 10/2012 | Lloyd et al. | 376/298 |

FOREIGN PATENT DOCUMENTS

| | | |
|---|---|---|
| JP | 3-41395 A | 2/1991 |
| JP | 5-307094 A | 11/1993 |
| JP | 6-265674 A | 9/1994 |
| JP | 2007170832 A | 7/2007 |
| WO | WO-2012/134611 A1 | 10/2012 |

OTHER PUBLICATIONS

Office Action dated Dec. 9, 2014 for corresponding Japanese Patent Application No. 2012-274172.

* cited by examiner

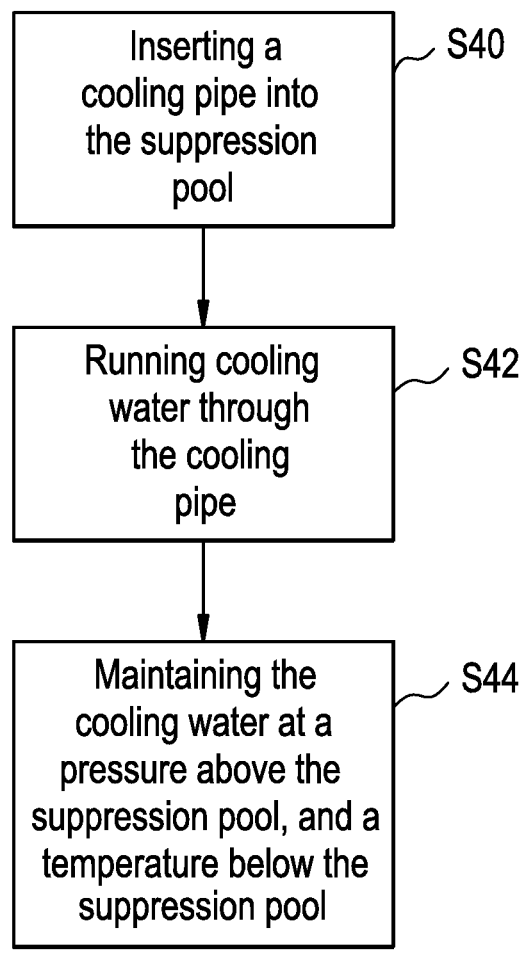

METHOD AND APPARATUS FOR AN ALTERNATIVE SUPPRESSION POOL COOLING FOR BOILING WATER REACTORS

BACKGROUND OF THE INVENTION

1. Field of the Invention

Example embodiments relate generally to nuclear reactors, and more particularly to a method and apparatus for an alternative cooling system for the suppression pool of a Boiling Water Reactor (BWR) nuclear reactor. The cooling system may be particularly beneficial in the event a plant emergency that causes plant electrical power to be disrupted, or normal cooling of the suppression pool to otherwise become impaired. The cooling system may also be used by the suppression pool to supplement the conventional residual heat removal system.

2. Related Art

FIG. 1 is a cut-away view of a conventional boiling water nuclear reactor (BWR) reactor building 5. The suppression pool 2 is a torus shaped pool that is part of the reactor building primary containment. Specifically, the suppression pool 2 is an extension of the steel primary containment vessel 3, which is located within the shell 4 of the reactor building 5. The suppression pool 2 is positioned below the reactor 1 and spent fuel pool 10, and is used to limit containment pressure increases during certain accidents. In particular, the suppression pool 2 is used to cool and condense steam released during plant accidents. For instance, many plant safety/relief valves are designed to discharge steam into the suppression pool 2, to condense the steam and mitigate undesired pressure increases. Conventionally, a BWR suppression pool 2 is approximately 140 feet in total diameter (i.e., plot plan diameter), with a 30 foot diameter torus shaped shell. During normal operation, the suppression pool 2 usually has suppression pool water in the pool at a depth of about 15 feet (with approximately 1,000,000 gallons of suppression pool water in the suppression pool 2, during normal operation).

The pool 2 is conventionally cleaned and cooled by the residual heat removal (RHR) system of the BWR plant. During normal (non-accident) plant conditions, the RHR system can remove water from the suppression pool 2 (using conventional RHR pumps) and send the water through a demineralizer (not shown) to remove impurities and some radioactive isotopes that may be contained in the water. During a plant accident, the RHR system is also designed to remove some of the suppression pool water from the suppression pool 2 and send the water to a heat exchanger (within the RHR system) for cooling.

During a serious plant accident, normal plant electrical power may be disrupted. In particular, the plant may be without normal electrical power to run the conventional RHR system and pumps. If electrical power is disrupted for a lengthy period of time, water in the suppression pool may eventually boil and impair the ability of the suppression pool to condense plant steam and reduce containment pressure.

In a plant emergency, use of the RHR system may cause highly radioactive water (above acceptable design limits) to be transferred between the suppression pool and RHR systems (located outside of primary containment). The transfer of the highly radioactive water between the suppression pool and RHR system may, in and of itself, cause a potential escalation in leakage of harmful radioactive isotopes that may escape the suppression pool. Additionally, radiation dosage rates in areas of the RHR system could be excessively high during an accident, making it difficult for plant personnel to access and control the system.

SUMMARY OF INVENTION

Example embodiments provide a method and an apparatus for providing an alternative cooling system for the suppression pool. The cooling system may be a single or multiple-stage, once-through heat exchanger that does not pose a hazard to the environment. The cooling system could be operated to cool the suppression pool even in the event of a plant accident when normal plant electricity is not available to run the conventional RHR systems and pumps. The cooling system may also be used simply to supplement the conventional RHR system, in the event that the RHR system remains functional during a serious plant accident. The cooling system could be operated and controlled from a remote location, which is ideal during a plant emergency.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 3 is a flowchart of a method of cooling the suppression pool, in accordance with an example embodiment.

DETAILED DESCRIPTION

Figure 1:
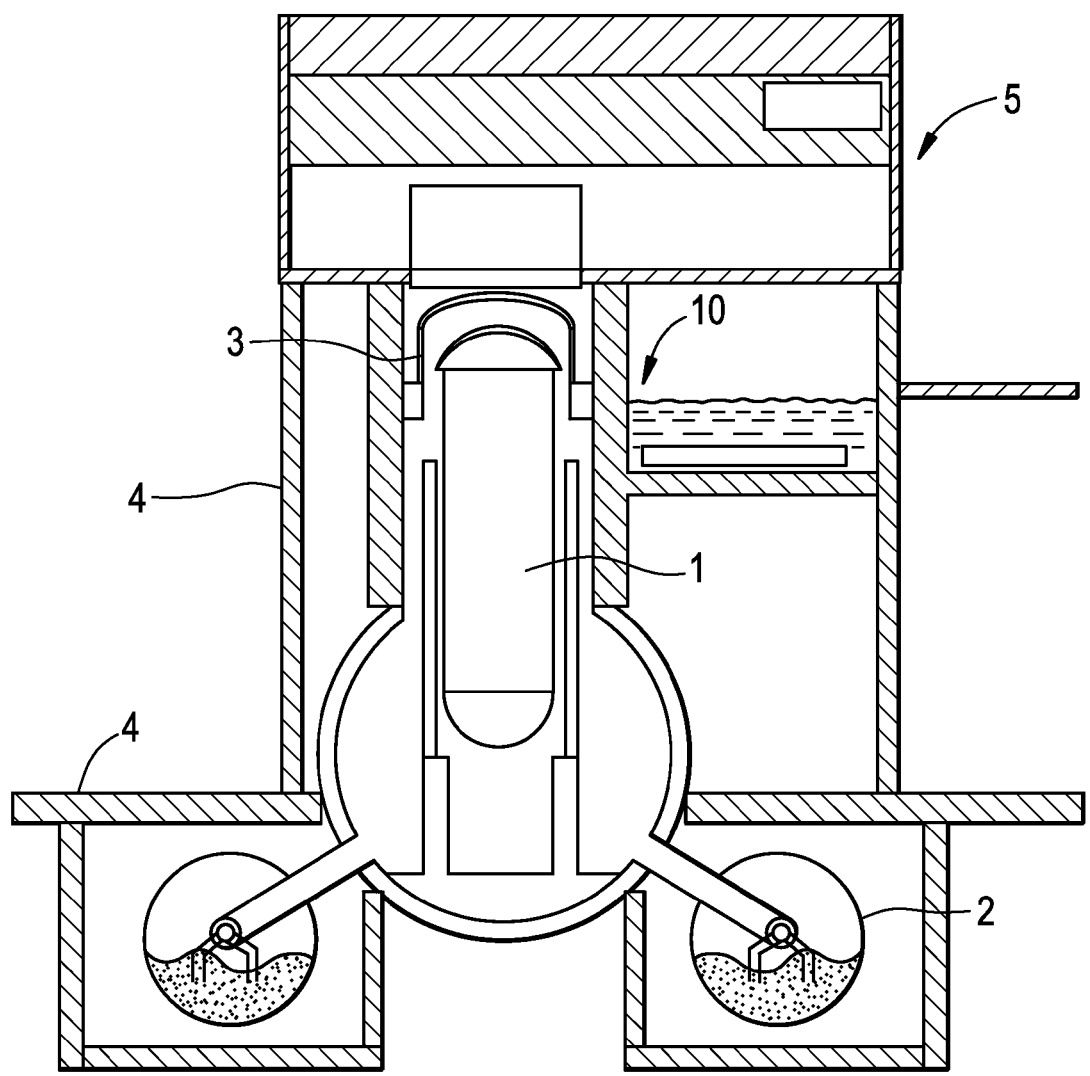
FIG. 1 is a cut-away view of a conventional boiling water nuclear reactor (BWR) reactor building.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
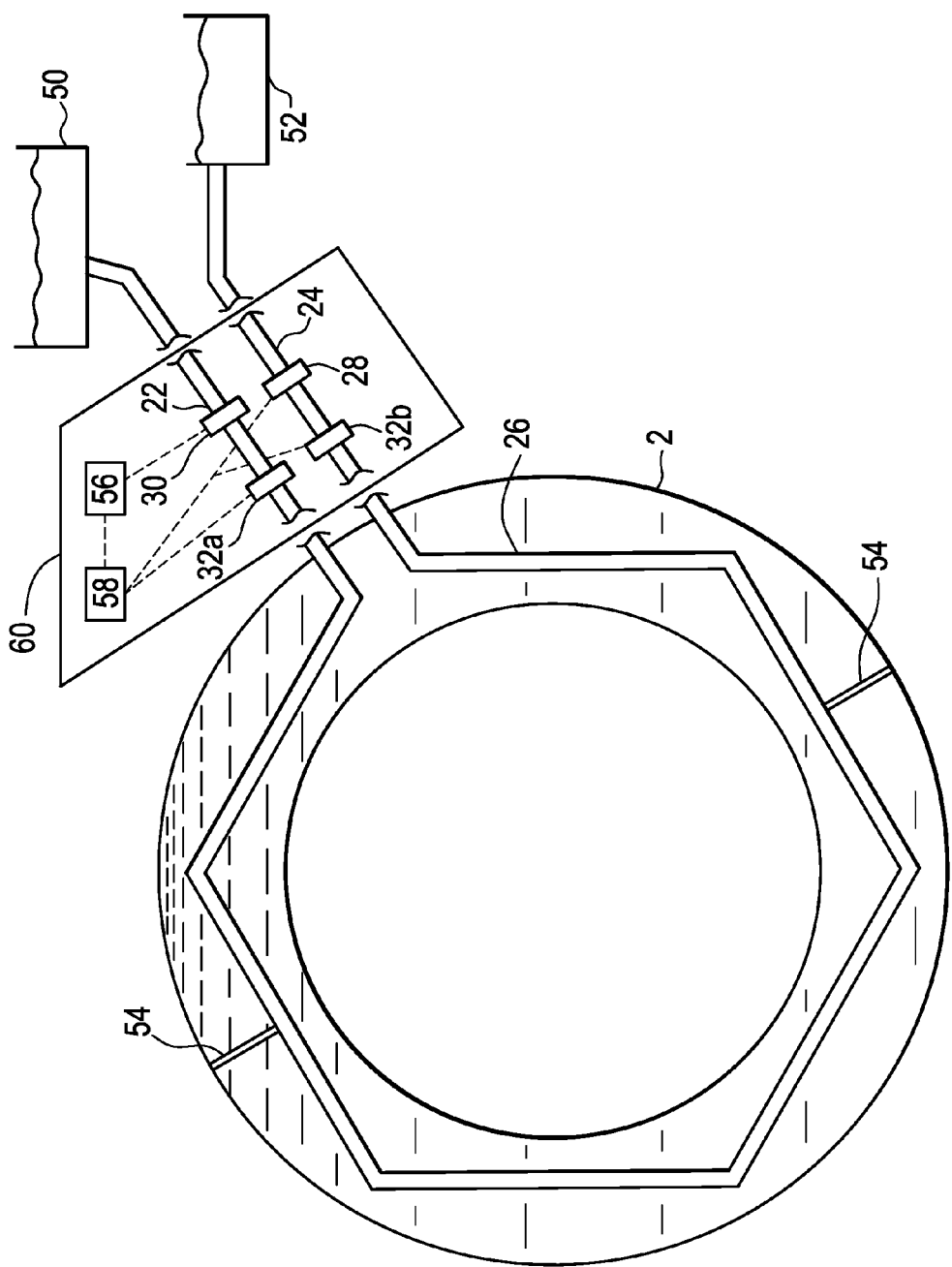
FIG. 2 is an overhead view of a suppression pool, in accordance with an example embodiment.

FIG. 2 is an overhead view of a suppression pool 2, in accordance with an example embodiment. The cooling system 20 may provide an in situ heat exchanger (within the suppression pool 2), without the need for removing water from the suppression pool 2, itself. The cooling system 20 may include a cooling pipe 26 that provides a flow of cooling water through the suppression pool 2. The cooling pipe 26 may include a single cold water inlet 22 and a single warm water outlet 24, to provide a single-stage, once-through heat exchanger within the suppression pool 2. Benefits of a single-stage, once-through cooling system 20 include an increased efficiency, as the greatest amount of heat may be exchanged per gallon of water flowing through the cooling pipe 26. Alternatively to a single-stage, once-through cooling system 20 (as shown in FIG. 2), a multi-stage cooling system 20 (not shown) may be used. The multi-stage cooling system 20 may include multiple single-stage passes of cooling pipe 26 that may each be the same as the single-stage cooling system 20 of FIG. 2.

To help mitigate the chance of radiation leakage from the suppression pool 2 into the cooling pipe 26, the pressure of cooling water flowing through the cooling pipe 26 may be maintained above the pressure of the water in the suppression pool 2. The suppression pool has a normal operating pressure of about 1 atmosphere. However, during plant accidents the suppression pool 2 is designed to reach pressures of about 58 psig. Therefore, to be conservative, the pressure of the fluid flowing through the cooling pipe 26 may be maintained at a pressure that is about 20 psig above the design pressure for the suppression pool 2. By maintaining pressure in the cooling pipe 26 above the pressure of the suppression pool 2, any leaks in the cooling pipe 26 will cause cooling water in pipe 26 to leak into the suppression pool 2 (as opposed to causing water in the suppression pool 2 to leak into the cooling pipe 26), which may reduce the possibility of highly radioactive water escaping the suppression pool 2 through the warm water outlet 24.

In addition to maintaining the pressure of the cooling pipe 26 above the pressure of the water in the suppression pool 2 (to mitigate the chance of radiation leakage), a radiation monitor 28 may also be located on the warm water outlet 24 piping. The radiation monitor 28 may measure radiation levels of cooling water flowing out of the suppression pool 2, to ensure that radiation leakage out of the pool 2 does not occur.

To pump cooling water through the cooling pipe 26, a dedicated cooling system pump 30 may be used. The pump 30 may run on a back-up diesel generator 58 or be directly driven by a diesel engine 58, to ensure that the pump 30 is not reliant on normal plant electrical power that may be unavailable in the event of a serious plant emergency. The size of the pump 30 may vary, depending on the size of the suppression pool 2. The size of the pump 30 may also vary based on design calculations for worst-case accidents that may cause suppression pool 2 temperatures to rise in the event of RHR system failure. In order to mitigate a plant accident for most BWR designs, the pump 30 may provide a cooling water flow-rate of about 300 gallons/minute. It should be understood that a greater cooling water flow-rate will cause increased heat to be exchanged, at the expense of a reduced efficiency of the cooling system 20.

It should be noted that conventional emergency portable pumps (not shown), which are generally available in a BWR nuclear plant, may be used as the cooling system pump 30. If a single-stage, once-through cooling pipe 26 is used, a single pump 30 may be adequate. If a multi-stage cooling pipe 26 is used, a single pump 30 for each stage of the cooling pipe 26 may be used (i.e., the multi-stage configuration may include multiple cooling systems 20, similar to the one shown in FIG. 2).

Alternative to using a cooling system pump 30, gravity draining of cooling water through the cooling pipe 26 may be implemented. Gravity draining of cooling water through the cooling pipe 26 offers an additional level of security for the cooling system 20, as no pumping power would be required to use the system. However, such a configuration would require a cooling water source 50 to be located at an elevation above the plant elevation of the suppression pool 2. A cooling water source 50 may be an ocean, a river, a large outdoor body of water, or a man-made structure containing a source of water. The warm water outlet 24 would then need to be discharged to a water discharge 52 location with an elevation that is below the plant elevation of the suppression pool 2. The water discharge 52 may also be an outdoor body of water, or a man-made structure used to collect the discharged water.

Whether gravity draining or a cooling system pump 30 is used for the cooling system 20, all controls (see controller 58) associated with the system 20 may be positioned in a remote location 60 that is remote to the suppression pool 2, for the safety of plant personnel. That is to say, locations of the pumps 30, inlet/outlet valves 32a/32b (if the valves are not manually operated), and radiation monitor 28, may be located a distance from the suppression pool 2. Similarly, inlet valves 32a (on the cold water inlet 22) and/or outlet valves 32b (on the warm water outlet 24), used to control the flow of water through the cooling pipe 26, may be positioned in locations remote from the suppression pool 2 (especially in the event that valves 32a/32b are manually operated). This is to ensure that plant personnel may safely operate the system 20 without being exposed to potentially high levels of radiation that may be present near the suppression pool 2 during an accident condition.

The configuration of the cooling pipe 26 may include a single loop through the suppression pool 2, as shown in FIG. 2. Alternatively, the cooling pipe 26 may entail other configurations, which may include additional loops or a "snake"-shaped configuration (not shown) through the pool. The cooling pipe 26 may be finned, or otherwise configured to maximize the surface area of the pipe 26 to increase the heat exchange capacity between the pipe 26 and the water in the suppression pool 2. Additionally, the cooling system pipe 26 may include branching of the cooling water pipe, which may also increase the heat that is exchanged between the cooling pipes 26 and the water in the suppression pool 2. Branched cooling system pipe 26 may still have a single cold water inlet 22 and a single warm water outlet 24, to reduce the amount of cooling piping 26 being exposed to areas of the plant other than the suppression pool 2. The single cold water inlet 22 and single warm water outlet 24 configuration may further reduce the possibility of radiation leakage to other areas of the plant by reducing the number of penetrations that are required in the secondary containment of the reactor building.

Elevation of the cooling pipe 26 within the suppression pool 2 should be low enough that the cooling pipe is fully submersed in suppression pool water, during both accident and non-accident conditions. Otherwise, the cooling system 20 may be ineffective in exchanging heat with the suppression pool 2. For more effective heat exchange, the cooling pipe 26 should also not be positioned at the lowest elevations of the suppression pool 2. By locating the pipe 26 a distance from the floor of the suppression pool 2, a natural convection current may be formed. Specifically, the cooling pipe 26 may produce cool water within the suppression pool 2 that may settle to the bottom of the pool 2, as warmer suppression pool 2 water (located under the pipe 26) may rise and be displaced by the settling cool water. This natural convection current may increase the efficiency of the cooling system 20. To ensure a natural convection current while still locating the cooling pipe 26 below the liquid level of the suppression pool, the cooling pipe may be located at an elevation of about 4 feet above the bottom floor of the suppression pool 2.

The cooling pipes 26 may be anchored to the walls of the pool 2 using anchors 54, for extra support. The cooling pipes 26 may be installed prior to BWR plant operation, to ensure that the cooling system 20 is in place prior to a potential plant accident. Alternatively, the cooling system 20 may be installed as a retro-fitted system.

It should be understood that cooling system 20 may be used during periods of time other than plant accident conditions. For instance, the cooling system 20 may be used simply to supplement the normal cooling of the suppression pool via the RHR system, to provide the suppression pool system with extra temperature design margins. It should also be understood that the temperature of the cooling water supply for the cooling system 20 will impact system performance. That is to say, the cooling system 20 will be more effective and efficient if colder cooling water supply is used.

FIG. 3 is a flowchart of a method of cooling the suppression pool, in accordance with an example embodiment. As shown in method step S40, a cooling pipe 26 may be inserted into the suppression pool 2. As shown in step S42, cooling water from a cooling water source may be run through the cooling pipe 26. As shown in step S44, the cooling water in the cooling pipe 26 may be maintained at a pressure that is above the pressure of the water in the suppression pool 2. The cooling water in the cooling pipe may also be maintained at a temperature that is below the temperature of the water in the suppression pool 2.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of cooling a suppression pool of a Boiling Water Reactor (BWR), comprising:
   removing heat from the suppression pool by running cooling water through a cooling pipe, the cooling water having a cooler temperature than water in the suppression pool;
   attaching a single inlet pipe and a single outlet pipe to the cooling pipe, the inlet and outlet pipe extending beyond the confines of the suppression pool;
   fluidly connecting the inlet pipe to a water source located at an elevation above a liquid level of the suppression pool; and
   fluidly connecting the outlet pipe to a water discharge location located at an elevation below the suppression pool,
   the running of the cooling water through the cooling pipe occurring via gravity draining.

2. The method of claim 1, further comprising:
   maintaining a pressure of the cooling water in the cooling pipe above the pressure of the suppression pool water.

3. The method of claim 1, further comprising:
   producing a natural convection within the suppression pool, by positioning portions of the cooling pipe above a bottom floor of the suppression pool and below a liquid level of the suppression pool.

4. The method of claim 1, further comprising:
   fluidly connecting the inlet pipe to a water source,
   connecting a pump to the inlet pipe, and
   electrically connecting a back-up diesel generator to the pump.

5. The method of claim 4, further comprising:
   positioning the pump, and all controls for the pump, in a location that is remote from the suppression pool.

6. The method of claim 1, further comprising:
   providing branching and fins on portions of cooling pipe.

7. The method of claim 1, further comprising:
   anchoring portions of the cooling pipe to a wall of the suppression pool.

8. The method of claim 1, further comprising:
   inserting a second cooling pipe into the suppression pool, and
   removing more heat from the suppression pool by running cooling water through the second cooling pipe, the cooling water having a cooler temperature than the suppression pool water.

9. A system of cooling a suppression pool of a Boiling Water Reactor (BWR), comprising:
   a cooling pipe, with portions of the cooling pipe being positioned below an expected liquid level of the suppression pool,
   a single inlet pipe attached to the cooling pipe,
   a single outlet pipe attached to the cooling pipe,
   the inlet and outlet pipe extending beyond the confines of the suppression pool,
   a water source fluidly coupled to the inlet pipe, the water source being located at an elevation above the expected liquid level of the suppression pool,
   a water discharge point located at an elevation below the suppression pool,
   the cooling pipe configured to provide a flow of cooling water through the cooling pipe via gravity draining, the cooling water being a higher pressure and cooler temperature than the suppression pool water.

10. The system of claim 9, further comprising:
a pump connected to the inlet pipe, and
a back-up diesel generator electrically connected to the pump.

11. The system of claim 10, further comprising:
controls electrically connected to the pump,
wherein the pump, and the controls for the pump, are positioned in a location that is remote from the suppression pool.

12. The system of claim 9, wherein the cooling pipe includes branches and fins.

13. The system of claim 9, further comprising:
one or more anchors connected to a wall of the suppression pool, to support the cooling pipe.

14. The system of claim 9, further comprising:
a second cooling pipe, with portions of the second cooling pipe being positioned below the liquid level of the suppression pool,
the second cooling pipe configured to provide a flow of cooling water through the cooling pipe that is a higher pressure and cooler temperature than the suppression pool water.

15. A system of cooling a suppression pool of a Boiling Water Reactor (BWR), comprising:
the suppression pool located in a reactor building,
a spent fuel pool located in the reactor building, and
a cooling pipe, with portions of the cooling pipe being positioned below an expected liquid level of the suppression pool,
a single inlet pipe attached to the cooling pipe,
a single outlet pipe attached to the cooling pipe,
the inlet and outlet pipe extending beyond the confines of the suppression pool,
a water source fluidly coupled to the inlet pipe, the water source being located at an elevation above the expected liquid level of the suppression pool,
a water discharge point located at an elevation below the suppression pool,
the cooling pipe configured to provide a flow of cooling water through the cooling pipe via gravity draining, the cooling water being a higher pressure and cooler temperature than the suppression pool water.

* * * * *